United States Patent
Op De Beeck et al.

(10) Patent No.: US 8,424,724 B2
(45) Date of Patent: Apr. 23, 2013

(54) SYSTEM FOR STORING AN ADDITIVE SOLUTION AND INJECTING IT INTO THE EXHAUST GASES OF AN ENGINE

(75) Inventors: Joel Op De Beeck, Lint (BE); Francois Dougnier, Boortmeerbeek (BE); Larry Tipton, Sterling Heights, MI (US)

(73) Assignee: Inergy Automotive Systems Research, Brussels (BE)

( * ) Notice: Subject to any disclaimer, the term of this patent is extended or adjusted under 35 U.S.C. 154(b) by 258 days.

(21) Appl. No.: 12/677,632

(22) PCT Filed: Sep. 19, 2008

(86) PCT No.: PCT/EP2008/062542
§ 371 (c)(1),
(2), (4) Date: Mar. 11, 2010

(87) PCT Pub. No.: WO2009/037340
PCT Pub. Date: Mar. 26, 2009

(65) Prior Publication Data
US 2010/0199648 A1   Aug. 12, 2010

(30) Foreign Application Priority Data

Sep. 21, 2007 (FR) .................................. 07 57766
Oct. 4, 2007 (FR) .................................. 07 58061

(51) Int. Cl.
*F01N 3/20* (2006.01)
*B67D 7/80* (2010.01)
(52) U.S. Cl.
USPC ........................................ 222/146.1; 60/295

(58) Field of Classification Search .................... 60/286, 60/297; 219/441, 535; 222/146.1, 146.2, 222/146.5
See application file for complete search history.

(56) References Cited

U.S. PATENT DOCUMENTS

| | | | |
|---|---|---|---|
| 5,884,475 A | 3/1999 | Hofmann et al. | |
| 6,374,868 B1 | 4/2002 | Channing | |
| 6,663,349 B1 * | 12/2003 | Discenzo et al. | 417/44.1 |
| 2002/0170616 A1 * | 11/2002 | Channing | 141/9 |
| 2006/0051276 A1 * | 3/2006 | Schaller et al. | 423/235 |
| 2007/0157602 A1 | 7/2007 | Gschwind | |
| 2009/0065508 A1 | 3/2009 | Haeberer et al. | |
| 2009/0078692 A1 | 3/2009 | Starck | |
| 2009/0100824 A1 * | 4/2009 | Starck et al. | 60/286 |

(Continued)

FOREIGN PATENT DOCUMENTS

| | | |
|---|---|---|
| DE | 202006010615 U | 10/2006 |
| DE | 102006027487 A1 | 3/2007 |

(Continued)

*Primary Examiner* — Kenneth Bomberg
*Assistant Examiner* — Dapinder Singh
(74) *Attorney, Agent, or Firm* — Oblon, Spivak, McClelland, Maier & Neustadt, L.L.P.

(57) ABSTRACT

System for storing an additive solution and injecting it into the exhaust gases of an engine, said system comprising two tanks for storing the solution and one pump for supplying the solution from these tanks to an injection line, these two tanks being in parallel and each being connected to the pump by a branch of a supply line, a first branch coming from the first tank giving rise to lower pressure drops than a second branch coming from the second tank so that the solution is normally withdrawn mainly from the first tank and is withdrawn from the second tank, and is only withdrawn from the second tank when the first tank is non-operational.

7 Claims, 3 Drawing Sheets

U.S. PATENT DOCUMENTS

Figure 1:
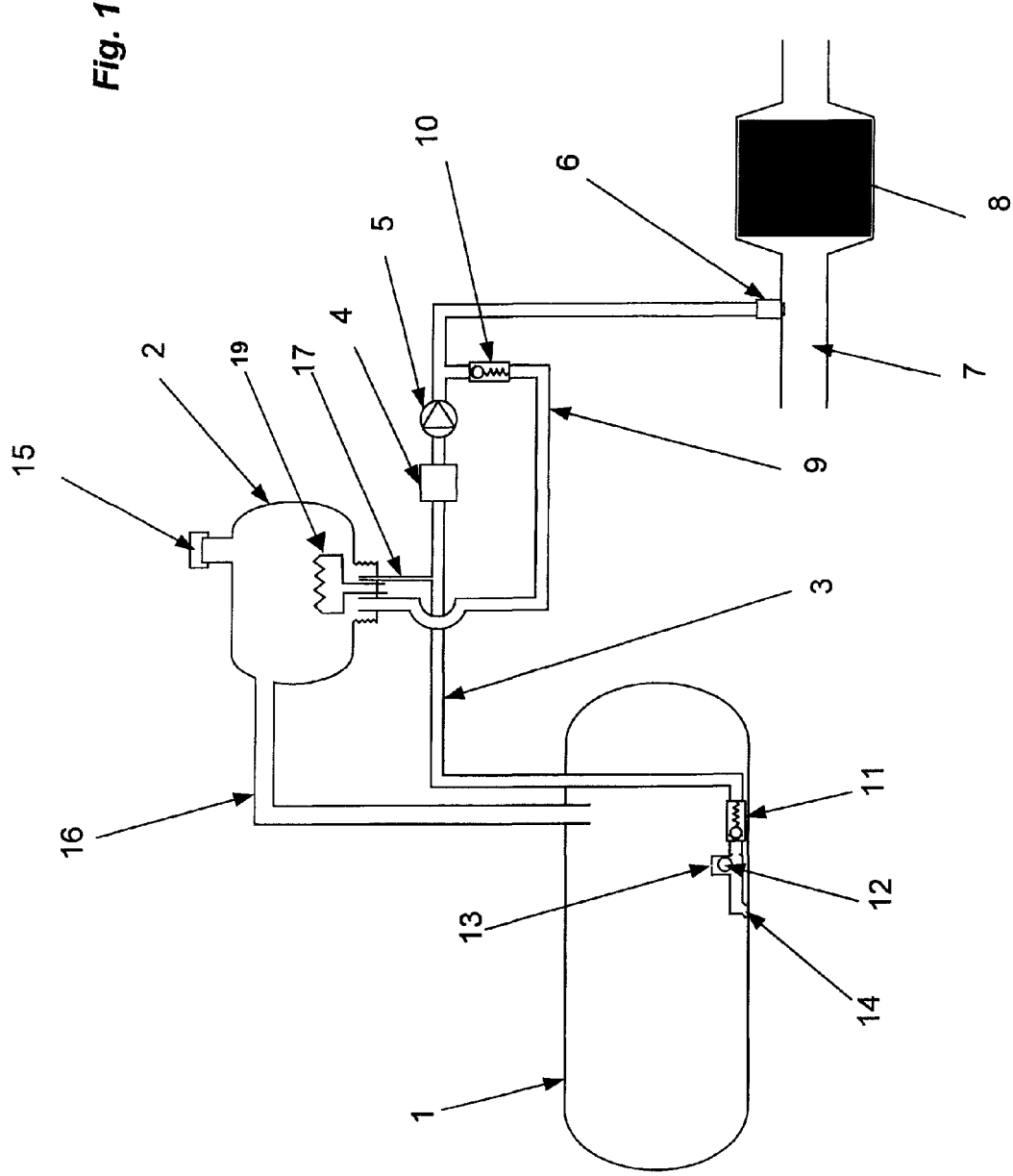

| | | |
|---|---|---|
| 2009/0230136 A1 | 9/2009 | Dougnier et al. |
| 2009/0311147 A1 | 12/2009 | Georis et al. |
| 2010/0025408 A1 | 2/2010 | Haeberer et al. |

FOREIGN PATENT DOCUMENTS

| | | |
|---|---|---|
| FR | 2905161 A1 | 2/2008 |
| FR | 2908819 A1 | 5/2008 |
| FR | 2911643 A1 | 7/2008 |
| FR | 2916188 A1 | 11/2008 |
| FR | 2917791 A1 | 12/2008 |
| FR | 2918111 A1 | 1/2009 |
| FR | 2918576 A1 | 1/2009 |
| FR | 2918718 A1 | 1/2009 |
| FR | 2918968 A1 | 1/2009 |
| WO | WO 2006064001 A1 | 6/2006 |
| WO | WO2006131201 | * 12/2006 |
| WO | WO 2007017080 A1 | 2/2007 |
| WO | WO 2008023021 A1 | 2/2008 |
| WO | WO 2008040589 A1 | 4/2008 |
| WO | WO 2008080689 A1 | 7/2008 |
| WO | WO 2008087153 A1 | 7/2008 |
| WO | WO 2008138960 A1 | 11/2008 |
| WO | WO 2008155303 A1 | 12/2008 |
| WO | WO 2009007405 A1 | 1/2009 |

* cited by examiner

SYSTEM FOR STORING AN ADDITIVE SOLUTION AND INJECTING IT INTO THE EXHAUST GASES OF AN ENGINE

CROSS-REFERENCE TO RELATED APPLICATIONS

This application is a U.S. national stage application under 35 U.S.C. §371 of International Application No. PCT/EP2008/062542 filed Sep. 19, 2008, which claims priority to French Patent Application No. 07.57766 filed Sep. 21, 2007 and to French Patent Application No. 07.58061 filed Oct. 4, 2007, these applications being incorporated herein by reference in their entirety for all purposes.

The present invention relates to a system for storing an additive solution and injecting it into the exhaust gases of an engine Changes in legislations (European legislation: EURO V and EURO VI programmes; US legislation: "Tier 2 Bin 5" phase of the EPA (Environmental Protection Agency)) that target the reduction of pollutant emissions from motor vehicles lead to systems for eliminating nitrogen oxides $NO_x$ from exhaust gases of vehicles.

One of the technologies developed consists in injecting into the exhaust line a solution containing a precursor of ammonia (generally urea) which chemically reduces the $NO_x$ to nitrogen over a catalyst. The vehicles are then fitted with a system that enables the precursor solution to be stored, and that also enables the latter to be pumped and injected into the exhaust.

In order to avoid filling it too frequently, it is advantageous to be able to have a sufficient onboard reserve. In particular, one of the targeted objectives is for the filling to be carried out when the vehicle is serviced. Provision should therefore be made for a range of 30 000 km, namely, taking into account the consumption of the urea solution (approximately 1 liter per 1000 km), a reserve of 30 l. However, the compact structures of the vehicles do not always allow such a volume to be made available at a single location.

One solution consists in using at least two tanks on the vehicle, where space permits, enabling the desired volume to be stored. It is then necessary to provide a system for transfer between these tanks, which cannot always be carried out by gravity.

The vehicle environment may lead, moreover, to a tank geometry that requires, for functional reasons, the installation of a reserve (trap) inside the tank. It is then necessary to also provide a system for transferring the ammonia precursor solution from the tank in order to supply the trap.

Furthermore, given that the aqueous urea solution generally used for this purpose (water/urea eutectic containing 32.5 wt % of urea) freezes at −11° C., it is necessary to provide a heating device to liquefy the solution in order to be able to inject it into the exhaust line in the event of starting in freezing conditions. For the purpose of preventing the problems of freezing but avoiding increasing too much the cost of the system, it would be desirable to only have to heat one of the two tanks Urea systems with two tanks have already been proposed. Thus, Patent U.S. Pat. No. 5,884,475 describes the use of two urea tanks in series: a main (storage) tank and a secondary (low volume) tank which is heated and which is used for starting in case of freezing. No specific device for the transfer of the solution from the main tank to the secondary tank is described in this document, the main urea feed pump playing this role by sucking through the secondary tank. However, when the secondary tank is not located below the main tank, it is not necessarily always full of solution, hence there is a risk of the pump operating when empty (which could damage it) and of the system not being supplied with additive.

One obvious solution for solving this problem would be to provide an additional pump between the two tanks However, such a solution is expensive.

Applications FR 0610039 and 0756106 in the name of the Applicant present a system that is improved from this point of view, which relies on valves with various calibrations. Although this solution is more economical, it may however require a fine adjustment, depending, for example, on the pressure drop differences from one structure to another.

The present invention aims to solve this problem by providing a simpler system than that described in these applications.

For this purpose, the present invention relates to a system for storing an additive solution and injecting it into the exhaust gases of an engine, said system comprising two tanks for storing the solution and one pump for supplying the solution from these tanks to an injection line, these two tanks being in parallel and each being connected to the pump by a branch of the supply line, the branch (I) coming from the first tank (1) giving rise to lower pressure drops than the branch (II) coming from the other tank (2) so that the solution is normally withdrawn mainly from tank (1) and is withdrawn from tank (2), and only from the latter, when tank (1) is non-operational.

With such a structure, it is sufficient to equip the tank (2) with a heating device in order to have an effective system in case of freezing.

It is of course possible to generalize the invention to a system comprising an "active" (heated) tank and several "passive" (unheated) tanks, the role of which is to increase the volume of solution on board.

The additive concerned by the present invention is preferably a reducing agent capable of reducing the $NO_x$ present in the exhaust gases of internal combustion engines. It is advantageously an ammonia precursor in aqueous solution. The invention gives good results with aqueous solutions of urea and in particular, eutectic water/urea solutions such as solutions of AdBlue®, the urea content of which is between 31.8 wt % and 33.2 wt % and which contain around 18% of ammonia. The invention may also be applied to urea/ammonium formate mixtures also in aqueous solution, sold under the trademark Denoxium® and which contain around 13% of ammonia. The latter have the advantage, with respect to urea, of only freezing from −35° C. onwards (as opposed to −11° C.), but have the disadvantages of corrosion problems linked to the release of formic acid.

The present invention may be applied to any internal combustion engine comprising a fuel return line, i.e. a line returning the surplus fuel not consumed by the engine to the fuel tank. It is advantageously applied to diesel engines, and in particular to the diesel engines of heavy goods vehicles.

The system according to the invention comprises at least two tanks intended for storing the additive and at least one injection line intended for injecting the additive into the exhaust gases of the engine.

In a first preferred variant, tank (2) is a tank located outside of the volume of tank (1). Preferably, tank (2) has a lower volume than tank (1) for thermal reasons and/or for gauging accuracy. In this variant, the additive storage tanks may be located anywhere in the vehicle, depending on the space available. However, according to one particularly advantageous variant, tank (2) is at a level above that of tank (1) and it comprises a fill pipe or opening and also an overflow line that opens into the tank (1) and is of suitable location and geometry so that tank (1) can be filled by the overflowing of tank (2). Such a variant makes it possible to simplify the filling by reducing it to a single operation.

In a second preferred variant, tank (2) is located inside tank (1) and constitutes a reserve for the latter.

In these two variants tank (2) is preferably equipped with a heating device so that the systems in question are capable of tackling freezing conditions. The structure of the system according to the invention then makes it possible to work without a heating device on tank (1), and hence to save money.

The heating device may be a system such as described in Application WO 2006/064001 in the name of the Applicant (and comprising a fuel return section that is able to be bypassed); may comprise a heating filament integrated into a connection (as described in Application FR 0607531 in the name of the Applicant); a flexible heater such as described in Applications FR 0755118 and 0756635 also in the name of the Applicant, etc.

According to the invention, the urea supply branch (II) coming from tank (2) gives rise to higher pressure drops than the branch (I) coming from tank (1) so that the solution is normally withdrawn mainly from tank (1) and is withdrawn from tank (2), and only from the latter, when tank (1) is non-operational (for example because it is empty or full of frozen solution). The higher pressure drops in branch (II) are generally obtained by reducing the flow area for the liquid at least locally in this branch (compared to the flow area in branch (I)). In other words: it is sufficient to ensure that branch (II) has a smaller minimum flow area than the minimum flow area of branch (I).

According to one preferred variant, the branches (I) and (II) are made up of sections of substantially cylindrical lines (optionally equipped with valves and/or other accessories) of different diameters. Alternatively, these sections may have identical diameters but the section (II) is provided with a constriction or any other device that causes a controllable pressure drop.

According to the invention, the supply line comprises two branches, each of them connecting the pump to one of the tanks These two branches may open into a common section of line that connects them to the pump. Alternatively, these two branches may tap directly into the pump. The variant according to which the two branches are connected to the pump by a common section is preferred as it allows savings to be made in terms of lengths of piping.

Hence, the system according to the invention generally uses at least one non-return device (valve, for example) in branch (I) to prevent tank (2) from emptying into tank (1) via branch (II) and the common section. This valve is advantageously combined with a float that opens branch (I) as long as there is some additive in tank (1), and closes it when tank (1) is empty.

The system according to the invention also preferably uses a non-return device (valve or other) in branch (II) in order to prevent liquid from returning to the system once the latter has been purged (if necessary). When tank (2) is a reserve inside tank (1), this device is advantageously a cover as described in Application FR 0756388 in the name of the Applicant. As described in this application, the cover is advantageously part of a compact module that incorporates the pump, a filter and a device that makes it possible to purge the line. In particular, this cover is preferably integrated into a common housing that surrounds the filter and at least one part of the pump.

Similarly, when the system comprises a return line (i.e. when the pump meters an excess amount of solution, which is preferably sent to tank (2) to prevent the latter from being empty in the event of prolonged freezing: see the aforementioned Application FR 0756106), it is advantageous to fit this line with a non-return device too.

The pump of the system according to the invention is preferably a rotary pump driven by a motor, the controller of which is governed by an electronic control unit (ECU). Preferably, the pump is of the gear pump type, for example such as that described in Application FR 0756387 in the name of the Applicant. It generally comprises a stator and a rotor and can preferably operate in two opposite rotational directions, one generally corresponding to supplying the supply line with liquid and the other corresponding to a purge of the supply line.

Any type of rotary electric motor may be suitable. Preferably, the motor is of the BLDC (brushless direct current) motor type. In this case, the pump is driven by a magnetic coupling between the rotor of the pump and a drive shaft of the motor.

This motor is preferably controlled by a controller, i.e. a control unit (generally comprising a PID regulator and a motor rotational speed controller) and an electrical power supply unit which supplies the motor with the power required to rotate it at the desired speed and which enables its direction of rotation to be reversed, where necessary. When branch (I) becomes non-operational and when the supply is carried out by branch (II) only, the controller according to this variant of the invention adjusts the rotational speed of the motor so that the amount of solution fed into the gases is sufficient despite the higher pressure drops.

In other words, according to one advantageous variant of the invention, the pump is a rotary pump driven by a motor controlled by a controller comprising a PID regulator and a motor rotational speed controller, so that when branch (I) becomes non-operational and when the solution is supplied by branch (II) only, the controller is capable of adjusting the rotational speed of the motor so that the amount of solution fed into the gases is sufficient despite the higher pressure drops.

Preferably, as described in Application FR 0700358 in the name of the Applicant, the pump controller is driven by an ECU which sends it a PWM (Pulse Width Modulation) control signal that includes information relating to the operating conditions of the pump. These conditions are understood to denote information relating to the operating pressure of the pump and also preferably at least one other piece of information such as its stopping/blocking, its rotational direction, etc. They are preferably all the operating conditions of the pump, namely: stopping, forward drive, reverse drive, operating pressure (at the pump outlet), etc. so that the pump operation is entirely conditioned by a single signal.

Within the context of this variant of the invention, the ECU is either an ECU specific to this function, or an ECU capable of also providing other functions and being, for that purpose, capable of also communicating with components other than the pump, for example with temperature and/or pressure sensors, and also of commanding and/or controlling the operation of these components. This ECU may, for example, be specific to an SCR function of a vehicle, or be integrated into the ECU of the engine.

The system according to the invention is generally also equipped with an injector that enables the additive to be injected into the exhaust gases. This injector may be of any known type. It may be what is called an "active" injector, i.e. one that includes a metering function, or what is called a "passive" injector then coupled to an additional metering device, such as a metering valve for example.

It is advantageously a passive injector, and in particular a nozzle or spray gun that makes it possible to obtain drops of solution having a diameter between 5 and 100 μm. Such a nozzle is advantageously equipped with an orifice having a diameter of around 150 μm-250 μm. This orifice is preferably supplied by a system of narrow channels (3-4) producing a "swirl" (vortex) phenomenon in the solution upstream of the nozzle. Clogging could be avoided by the purge which removes the last droplets of urea; there is therefore no crystallization by evaporation.

In this variant according to the invention, the amount of solution is preferably metered by regulating the opening frequency and duration of the metering valve. This valve may be a piezoelectric or solenoid valve, the regulation of which may be electronic.

Figure 2:
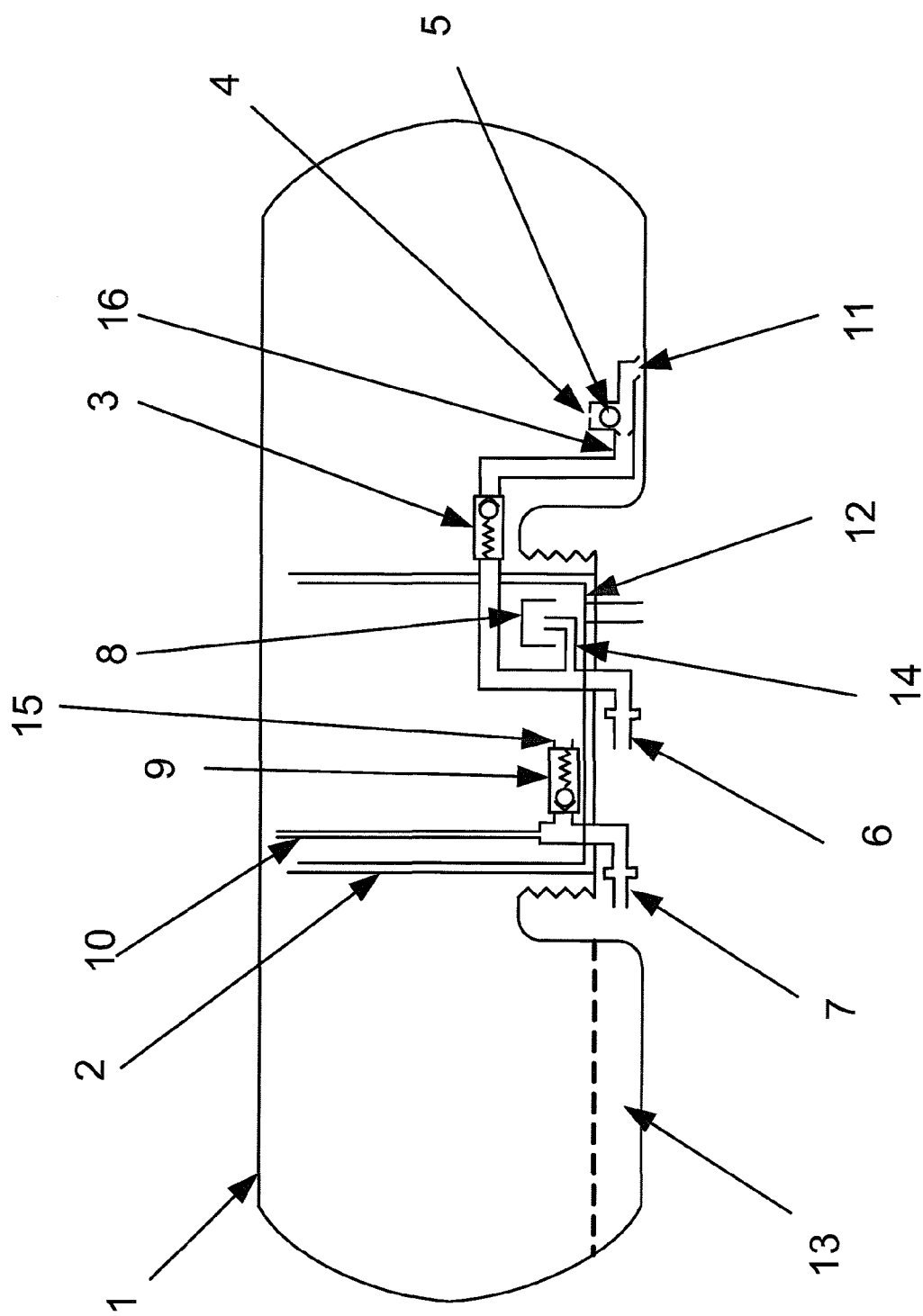

The present invention is illustrated in a non-limiting manner by FIGS. 1 and 2.

FIG. 1 represents an SCR system having 2 separate tanks (1, 2) and

FIG. 2 an SCR system having a secondary tank (2) (reserve tank) integrated into a main storage tank (1).

They both represent variants of systems according to the invention intended for injecting a urea solution into the exhaust gases of a diesel vehicle.

FIG. 1 illustrates the example of a system that has 2 tanks (1) and (2). In this configuration tank (2) is equipped with a heating system (19) that makes it possible to provide a reserve of ammonia precursor that is liquid at low temperatures (<−11° C.). The system is filled with precursor solution through a single orifice (15), since tank (1) is filled by the overflowing of tank (2) via the duct (16). In the case where the filling of tank (1) and the physical state of the ammonia precursor (liquid form) allow it, the pump (5) sucks up from this tank via the line (3) through the orifice (4) and also from tank (2) via the line (17). These two lines are sized so that the suction flow rate is higher in tank (1) than in tank (2). The fluid passes through the filter (4), its pressure is limited by the calibrated valve (10), with a return line (9) to tank (2). The injector (6) delivers the solution in the form of a jet of fine droplets into the exhaust line (7), upstream of the SCR catalyst (8). The non-return valve (11) prevents tank (2) from draining into tank (1). When the solution is not available from tank (1) (following freezing), the liquid is withdrawn from tank (2), after thawing under the action of the heating system (19). When tank (1) is empty, the float (12) seals the conduit (3), and the liquid is withdrawn from tank (2) only. On filling, the float (12) rises in the housing (13), unblocking the line. This system can be generalized to several tanks.

FIG. 2 shows the case of transfer between the main volume of a tank (1) and a reserve (2) positioned in this case on an immerged base plate (mounting plate). This case applies particularly well to a thin tank design. The mounting plate is equipped with various accessories, including a heater (12), that make it possible to thaw the precursor at the time of low temperatures. The assembly is connected to the injection system by supply (6) and return (7) tubes. The solution is withdrawn from the main volume of tank (1) through the orifice (11) and from the reserve volume (2) by the conduit (14). The excess solution returns to the reserve (2) via line (15); the reserve may overflow into the tank. The suction flow rate through the line (14) is lower than that through the orifice (11). The non-return valve (3) prevents the reserve (2) from draining into tank (1). In the event of freezing, the heating system (12) makes it possible to operate the injection system by withdrawal from the reserve (2). When tank (1) is empty, the float (5) seals the conduit (16) (preventing the possible sucking up of gas), and the system operates with the reserve volume. The version represented also illustrates the possibility of purging the injection system, by reversing the pumping direction and taking air from the headspace of the tank through the conduit (10), and return to the reserve via the conduit (14). The cover (8) prevents liquid from going back into the injection system after the purge step.

It should be noted that the use of a conduit (10) for carrying out the purge is also advantageous outside the context of the invention for any SCR system with a return line (excess metering of urea). Thus, according to one particularly advantageous variant that can also be used outside the context of the invention, this conduit is in fact (as illustrated) a capillary tube that is carefully calibrated in order both to allow purging by sucking air from the headspace of the tank (as explained above), but also to control the pressure drops in the return line.

Figure 3:
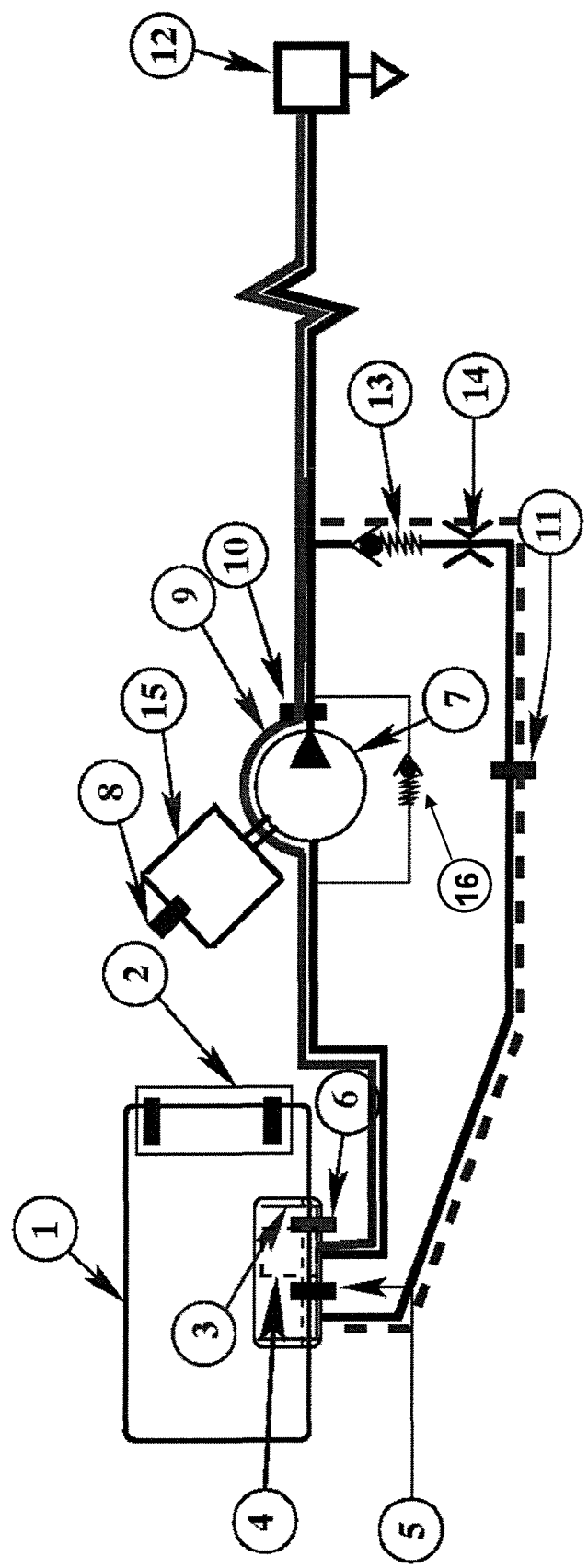

Thus, for example, FIG. 3 illustrates a system described in Application FR 0755875, also in the name of the Applicant, which comprises the following components:

1: urea tank;
2: gauge (level sensor);
3: flexible heater;
4: filter;
5: temperature sensor;
6: current sensor for the flexible heater;
7: pump;
8: speed sensor;
9: heating filament for the lines and pump heating cartridge;
10: pressure sensor;
11: current sensor for the line heater;
12: injector;
13: non-return valve that prevents the liquid from going round in circles (in the loop created by the feed line and that for return to the tank) during the purge (when the pump rotates in reverse;
14: calibrated orifice (restriction)—used to set the flow rate and to add resistance in order to increase the pressure (by increasing pressure drops in the return line);
15: motor for driving the pump; and
16: non-return valve that enables the pressure at the pump outlet to be regulated.

Such a system may advantageously be simplified by replacing the non-return valve (13) and the restriction (14) present in the return line with a capillary tube such as the tube (10) in the return line (7) of the preceding figure (FIG. 2).

It should also be noted that in systems where the purge cannot be carried out through the injector (for example, because the latter is outside the control perimeter of the SCR system), the fact of making use of a capillary also makes it possible to do without a purge valve as described in Application FR 0757602, also in the name of the Applicant.

The invention claimed is:

1. A system for storing an additive solution and injecting it into the exhaust gases of an engine, said system comprising:
   two tanks that store the solution, the two tanks including a first tank and a second tank; and
   a pump that supplies the solution from the two tanks to an injection line,
   wherein the two tanks are in parallel and each of the two tanks is connected to the pump by a branch of a supply line,
   wherein a first branch coming from the first tank gives rise to lower pressure drops than a second branch coming from the second tank so that the solution is normally withdrawn mainly from first tank and is withdrawn from second tank, and is only withdrawn from the second tank when the first tank is non-operational,
   wherein the first branch and the second branch are made up of sections of substantially cylindrical lines of different diameters, wherein both the first branch and the second branch are connected to the pump by a common section, and wherein the system comprises at least one non-return device in the first branch.

2. The system according to claim 1, wherein the second tank is a tank located outside of a volume of the first tank, wherein the second tank has a smaller volume than the volume of the first tank, wherein the second tank is located at a level above that of the first tank, and wherein the second tank comprises a fill pipe or an opening and also an overflow line that opens into the first tank and is of suitable location and geometry so that the first tank is filled by an overflowing of the second tank.

3. The system according to claim 1, wherein the second tank is located inside the first tank and constitutes a reserve for the first tank.

4. The system according to claim 2, wherein the second tank is equipped with a heating device.

5. The system according to claim 1, wherein the non-return device is a valve combined with a float that opens the first branch as long as there is some additive solution in the first tank, and closes the first branch when the first tank is empty.

6. The system according to claim 1, comprising a return line equipped with a non-return device.

7. The system according to claim 1, wherein the pump is a rotary pump driven by a motor controlled by a controller comprising a Proportional-Integral-Derivative (PID) regulator and a motor rotational speed controller, and wherein when the first branch becomes non-operational and when the solution is supplied by the second branch only, the controller adjusts the rotational speed of the motor so that an amount of solution fed into the exhaust gases is sufficient despite higher pressure drops.

* * * * *